United States Patent [19]
Mercer et al.

[11] Patent Number: 5,929,138
[45] Date of Patent: Jul. 27, 1999

[54] HIGHLY THERMALLY CONDUCTIVE YET HIGHLY COMFORMABLE ALUMINA FILLED COMPOSITION AND METHOD OF MAKING THE SAME

[75] Inventors: Frank W. Mercer, Belmont; David P. Ching, Mountain View; Zbigniew Cichocki, Newark; Robert H. Reamey, Palo Alto, all of Calif.

[73] Assignee: Raychem Corporation, Menlo Park, Calif.

[21] Appl. No.: 08/746,024

[22] Filed: Nov. 5, 1996

[51] Int. Cl.$^6$ .............................. C08K 7/16; C08K 3/18; C08K 3/10; C08L 83/04
[52] U.S. Cl. ..................... 523/220; 523/223; 524/430; 524/437; 524/786; 524/862
[58] Field of Search .................................. 523/220, 223; 524/430, 437, 786, 862; 428/447, 523

[56] References Cited

U.S. PATENT DOCUMENTS

| | | | |
|---|---|---|---|
| 3,020,260 | 2/1962 | Nelson | 260/46.5 |
| 4,237,441 | 12/1980 | van Konynenberg et al. | 338/22 R |
| 4,369,284 | 1/1983 | Chen | 524/476 |

(List continued on next page.)

FOREIGN PATENT DOCUMENTS

| | | | |
|---|---|---|---|
| 0 096 888 A2 | 12/1983 | European Pat. Off. | C08L 83/06 |
| 0 295 881 A2 | 12/1988 | European Pat. Off. | C08K 3/00 |
| 0496419 A2 | 7/1992 | European Pat. Off. | C08L 83/04 |
| 0 499 585 A1 | 8/1992 | European Pat. Off. | C01F 7/02 |
| 0509515 A1 | 10/1992 | European Pat. Off. | C08L 83/04 |
| 0566093 | 10/1993 | European Pat. Off. | C09J 7/02 |
| WO 90/05166 | 5/1990 | WIPO | C08L 53/00 |
| WO 93/23472 | 11/1993 | WIPO | C08L 53/02 |
| WO 95/02504 | 1/1995 | WIPO | B32B 3/00 |
| WO 96/05602 | 2/1996 | WIPO | H01B 3/46 |
| WO 96/10608 | 4/1996 | WIPO | C08L 83/04 |
| WO 96/23007 | 8/1996 | WIPO | C08F 8/46 |
| WO 96/30443 | 10/1996 | WIPO . | |

OTHER PUBLICATIONS

"Aluminum Oxide (Alumina)," in Kirk–Othmer Encyclopedia of Chemical Technology, vol. 2, 3rd Ed., pp. 218–244 (1978).
Beavis et al., AICHE Symp. Ser. (1985), vol. 81 (245, Heat Transfer), pp. 1–6.
Hansen et al., Polym. Eng. Sci., vol. 15, No. 5, pp. 353–356 (May 1975).
Peterson, IEEE 40th Electronic Components and Technology Conf. (May 1990), pp. 613–619.
Progelhof et al., Polym. Eng. Sci., vol. 16, No. 9, pp. 615–625 (Sep. 1976).
Reed, "Principles of Ceramics Processing," 2nd Ed., pp. 40–42 (John Wiley & Sons 1995).
WPI Abstract No. 940216382/26 (abstract of TW 94101309).

Primary Examiner—Kriellion S. Morgan
Attorney, Agent, or Firm—Herbert G. Burkard; Yuan Chao

[57] ABSTRACT

A highly thermally conductive but yet highly conformable composition is made from gel filled with alumina. The use of α-alumina in which at least 10 weight % of the α-alumina particles have a particle size of at least 74 μm makes possible the high filler levels needed to attain high thermal conductivity, without causing the decrease in elongation and softness normally associated with high filler levels. Further improvements are observed if the α-alumina and the gel (or precursor thereof) are mixed with a specific energy input of at least 10 Joule/g. The input of such specific energy has the effect making the resulting composition more conformable than it otherwise would be. The composition may be internally supported by a flexible matrix such as a fabric or open-celled foam.

14 Claims, 1 Drawing Sheet

U.S. PATENT DOCUMENTS

| | | | |
|---|---|---|---|
| 4,373,239 | 2/1983 | Henry et al. | 29/132 |
| 4,548,862 | 10/1985 | Hartman | 428/323 |
| 4,574,879 | 3/1986 | DeGree et al. | 165/185 |
| 4,585,822 | 4/1986 | Streusand | 524/443 |
| 4,595,635 | 6/1986 | Dubrow et al. | 428/447 |
| 4,600,261 | 7/1986 | Debbaut | 339/116 C |
| 4,634,207 | 1/1987 | Debbaut | 339/116 C |
| 4,643,924 | 2/1987 | Uken et al. | 428/35 |
| 4,680,233 | 7/1987 | Camin et al. | 428/426.6 |
| 4,690,831 | 9/1987 | Uken et al. | 427/44 |
| 4,701,574 | 10/1987 | Shimirak et al. | 174/93 |
| 4,716,183 | 12/1987 | Gamarra et al. | 522/80 |
| 4,741,940 | 5/1988 | Reed | 428/68 |
| 4,777,063 | 10/1988 | Dubrow et al. | 427/44 |
| 4,852,646 | 8/1989 | Dittmer et al. | 165/185 |
| 4,865,905 | 9/1989 | Uken | 428/220 |
| 4,900,877 | 2/1990 | Dubrow et al. | 174/35 GC |
| 4,942,270 | 7/1990 | Gamarra | 174/93 |
| 5,008,307 | 4/1991 | Inomata | 523/220 |
| 5,021,494 | 6/1991 | Toya | 524/404 |
| 5,060,114 | 10/1991 | Feinberg et al. | 361/387 |
| 5,079,300 | 1/1992 | Dubrow et al. | 525/106 |
| 5,104,930 | 4/1992 | Rinde et al. | 524/871 |
| 5,140,746 | 8/1992 | Debbaut | 29/885 |
| 5,357,057 | 10/1994 | Debbaut | 174/84 R |
| 5,530,060 | 6/1996 | Fujiki et al. | 524/786 |

HIGHLY THERMALLY CONDUCTIVE YET HIGHLY COMFORMABLE ALUMINA FILLED COMPOSITION AND METHOD OF MAKING THE SAME

BACKGROUND OF THE INVENTION

It may be important in an electrical or electronic device to conduct heat away from modules, enclosures, circuit boards, integrated circuit chips, and other components and towards a metal plate or other heat sink element, for the effective dissipation of heat generated during operation.

Greases and pastes filled with thermally conductive fillers have been used for such purpose. However, they tend to migrate into adjacent spaces over time, particularly at elevated temperatures, contaminating other areas of the device and causing a loss of the desired thermal conductivity. They are also difficult to handle, particularly when re-entering the device for repair or replacement, because they are difficult to clean from surfaces on which they have been placed.

Alternatives to greases and pastes are thermally conductive gels or pressure sensitive adhesives, such as disclosed in Dittmer et al., U.S. Pat. No. 4,852,646 (1989); Mercer et al, WO 96/23007 (1996); and Chiotis et al., WO 96/05602 (1996). Because they are high elongation, low modulus (soft) materials, gels are highly conformable, allowing them to establish excellent thermal contact with irregular surfaces. Gels offer the advantage of facile re-enterability: they generally have a cohesive energy greater than their bonding energy to the surface onto which they have been applied, allowing them to debond cleanly. Many gels are made from crosslinked polymers systems, so that they will not migrate, unlike greases and pastes. (Gels made from a thermoplastic base polymer are also known; such gels also will not migrate provided the service temperature is kept below the melting temperature of the base polymer.)

A thermally conductive gel-based composition is made by filling the gel with a thermally conductive filler such as particulate silicon nitride, aluminum nitride, boron nitride, or alumina (aluminum oxide). The nitrides, especially aluminum nitride, are desirable because their high specific thermal conductivities enable their use in relatively smaller amounts while still achieving a desired high thermal conductivity in the resulting composition. However, aluminum and boron nitrides are more expensive than alumina by about two orders of magnitude, limiting their commercial utility. Also, we have discovered that aluminum nitride is hydrolytically unstable and will react with ambient moisture. The hydrolysis of aluminum nitride can cause a degradation in composite properties. In addition, the ammonia generated in the hydrolysis of aluminum nitride can accelerate corrosion and cause degradation of materials it comes in contact with and can interfere with the cross-linking of gel systems such as organopolysiloxane crosslinked via hydrosilylation chemistry.

Alumina's lower specific thermal conductivity (compared to the nitrides) means that a larger amount must be used in order to attain the same final thermal conductivity in a filled gel. Nevertheless, the cost and storage stability advantages of alumina make it attractive as a thermally conductive filler. Where the thermal conductivity required in the final gel is relatively low, the need to employ larger amounts of alumina is not a serious limitation. However, where the final gel needs to be highly thermally conductive (meaning, for the purposes of this specification, a thermal conductivity of at least 1.3 watt/m-°C.), the large amount of alumina required (generally in excess of 60 weight per cent) adversely affects the elongation and softness of the final product, compromising its conformability.

BRIEF SUMMARY OF THE INVENTION

Thus, the problem addressed and solved by this invention is how to make a highly thermally conductive alumina filled gel which retains a high degree of conformability. Firstly, we have discovered that such a result can be achieved by employing α-alumina wherein at least 10 weight percent of the α-alumina has a particle size exceeding a prescribed minimum size. (In contradistinction, the prior art has taught that particle shape and orientation, not particle size, are key parameters in determining the thermal conductivity of a particulate-filled system. See, for example, Hansen et al., *Polymer Engineering and Science,* Vol. 15, No. 5, pp. 353–356 (May 1975).)

Secondly, we have discovered that the result of high thermal conductivity while retaining high conformability is more effectively achieved if the combination of the α-alumina and gel material (or precursor or precursor components thereof) is mixed with a minimum prescribed amount of mechanical energy being input into the combination.

Accordingly, in a first embodiment there is provided a method of making a thermally conductive and conformable composition, comprising the steps of:

(a) providing 100 parts by weight of a gel;

(b) combining the gel with between 150 and 400 parts by weight of α-alumina, wherein at least 10 per cent by weight of the α-alumina has a particle size of at least 74 μm, to form a combination of the gel and the α-alumina; and (c) mixing the combination to make the thermally conductive and conformable composition.

In a second embodiment, there is provided a method of making a thermally conductive and conformable composition, comprising the steps of:

(a) providing 100 parts by weight of a precursor material curable into a gel;

(b) combining the precursor material with between 150 and 400 parts by weight of α-alumina, wherein at least 10 per cent by weight of the α-alumina has a particle size of at least 74 μm, to form a combination of the precursor material and the α-alumina; and (c) curing the precursor material into a gel to form the thermally conductive and conformable composition.

In a third embodiment, there is provided a method of making a thermally conductive and conformable composition, comprising the steps of:

(a) separately providing first and second precursor components, which when mixed together, cure to form a gel, the combined amounts of the first and the second precursor components totaling 100 parts by weight;

(b) separately combining α-alumina with each of the first and second precursor components to form respective first and second combinations comprising α-alumina and a first or second precursor component respectively, wherein at least 10 weight per cent of the α-alumina has a particle size of at least 74 μm and the total amount of α-alumina is between 150 and 400 parts by weight; and (c) mixing the first and second combinations and curing to form the thermally conductive and conformable composition.

It is preferred that, after the α-alumina has been combined with the gel, the precursor material, or the first and second components (as the case may be), the combination be mixed with an input of a specific energy of at least 10 Joule/g.

In a fourth embodiment, there is provided a conformable and thermally conductive composition, comprising (a) 100 parts by weight of a gel and (b) between 150 and 400 parts by weight of α-alumina, wherein at least 10% by weight of the α-alumina has a particle size of at least 74 μm.

In a fifth embodiment, there is provided an article comprising (I) a conformable and thermally conductive composition, comprising (a) 100 parts by weight of a gel and (b) between 150 and 400 parts by weight of α-alumina, wherein at least 10 weight per cent of the α-alumina has a particle size of at least 74 μm; and (II) a flexible matrix internally supporting the composition.

BRIEF DESCRIPTION OF THE DRAWING(S)

FIGS. 1a and 1b show the composition of this invention supported by an open-cell foam matrix and a fabric matrix, respectively.

DETAILED DESCRIPTION OF THE INVENTION

Figure 1A:
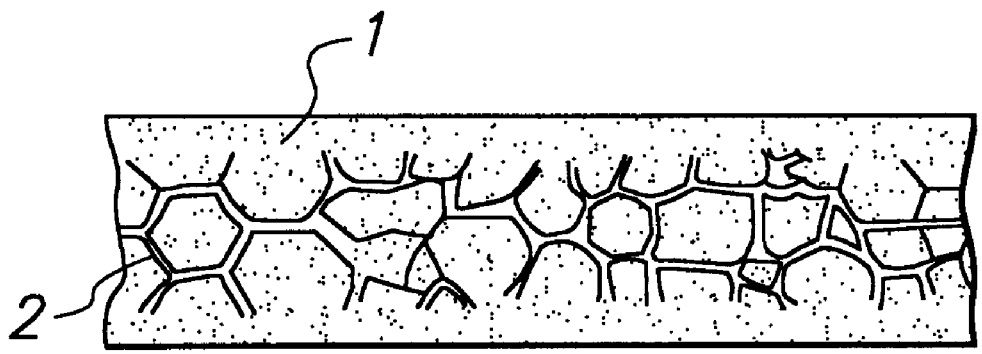
Figure 1B:
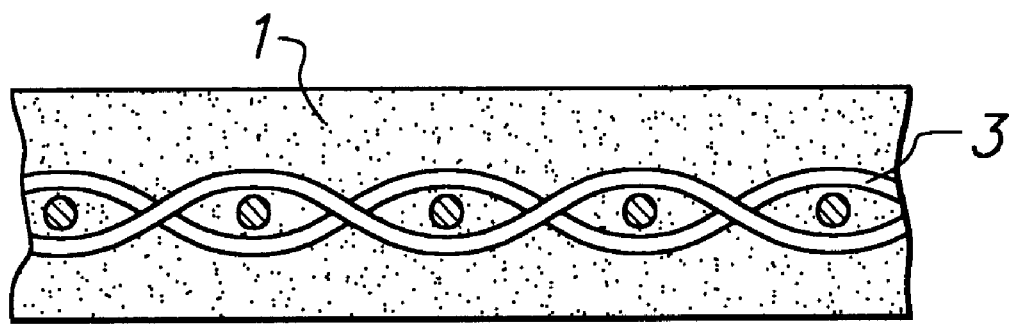

The compositions of this invention have a high thermal conductivity while retaining a high degree of conformability—i.e., they remain soft and elastic. Preferably, they have a thermal conductivity of at least 1.3 watt/m-°C., a hardness of less than 1,000 g, and an elongation at break of at least 50%. They comprise a gel and α-alumina as a particulate filler for imparting thermal conductivity.

Gels may be viewed as substantially dilute, fluid-extended polymer systems which exhibit no steady state flow. As discussed in Ferry, "Viscoelastic Properties of Polymers," 3rd Ed., p. 529 (J. Wiley & Sons, N.Y. 1980), a polymer gel is a solution cross-linked by chemical bonds, crystallites, or some other kind of junction. The absence of the steady state flow is the key definition of the solid-like properties, while the substantial dilution is necessary to give the relatively low modulus of gels. The solid nature is achieved by a continuous network structure formed in the material generally through crosslinking the polymer chains. The crosslinking can be either physical or chemical as long as the crosslink sites are sustained at the use conditions of the gel. Thus, gels suitable for use in this invention can be classified as chemically crosslinking ones, in which a precursor material cures to form the gel material, and thermoplastic ones, in which the crosslinks are physical.

Suitable chemically crosslinked gel materials include systems based on polyurethanes, polyureas, silicones (also known as polysiloxanes or organopolysiloxanes), anhydride containing polymers, and the like. Exemplary disclosures include Dubrow et al., U.S. Pat. No. 4,595,635 (1986); Debbaut, U.S. Pat. No. 4,600,261 (1986); Dubrow et al., U.S. Pat. No. 4,777,063 (1988); Dubrow et al., U.S. Pat. No. 5,079,300 (1992); Rinde et al., U.S. Pat. No. 5,104,930 (1992); Chiotis et al., WO 96/10608 (1996); Mercer et al., WO 96/23007 (1996); and copending commonly assigned application of Craig et al, application Ser. No. 08/573,163, filed Dec. 15, 1995 (Attorney's docket number MP1578-US1); the disclosures of which are incorporated herein by reference.

Preferably, the gel is a silicone gel based on polydimethylsiloxane (PDMS) and prepared by the platinum-catalyzed reaction between a vinyl-functionalized PDMS and a hydride-functionalized PDMS. Such gels can be formed in a number of ways. One method synthesizes the crosslinked polymer in the presence of a non-reactive extender fluid, e.g. trimethylsiloxy-terminated PDMS. An alternative method fabricates the silicone gel by reacting a stoichiometric excess of a multifunctional vinyl-substituted silicone with a multifunctional hydride-substituted silicone in such a fashion that a soft, fluid-extended system is obtained. In the latter approach, a vinyl-rich sol fraction is obtained. Of course, combination systems are possible. Suitable examples of either of these gel systems are taught in, inter alia, Debbaut, U.S. Pat. No. 4,600,261 (1986); Debbaut, U.S. Pat. No. 4,634,207 (1987); Debbaut, U.S. Pat. No. 5,357,057 (1994); Dubrow et al., U.S. Pat. No. 5,079,300 (1992); Dubrow et al., U.S. Pat. No. 4,777,063 (1988); and Nelson, U.S. Pat. No. 3,020,260 (1962); the disclosures of which are incorporated herein by reference. Silicone gel systems based on alternative cure techniques such as peroxide, UV light, and high energy radiation may also be used.

Alternatively, the gel may be a thermoplastic gel, based on a thermoplastic polymer such as styrene-(ethylene butylene)-styrene block copolymer (SEBS) or styrene-(ethylene propylene)-styrene block copolymer (SEPS) and the like, extended with an extender oil of naphthenic or nonaromatic or low aromatic content hydrocarbon oil. Exemplary disclosures include Chen, U.S. Pat. No. 4,369,284 (1983); Gamarra et al., U.S. Pat. No. 4,716,183 (1987); Gamarra, U.S. Pat. No. 4,942,270 (1990); Sutherland et al., WO 90/05166; and Hammond et al., WO 93/23472 (1993); the disclosures of which are incorporated herein by reference. Gels produced from SEBS or SEPS and paraffinic oils comprise glassy styrenic microphases interconnected by a fluid-extended elastomeric phase. The microphase-separated styrenic domains serve as the junction points in the systems. Such gels are examples of thermoplastic systems. Conversely, silicone gels are thermoset gels, chemically cross-linked via a multifunctional cross linking agent.

The preferred form of alumina is α-alumina, because it is more thermally conductive than other forms such as the gamma and beta forms. More preferably, the α-alumina is calcined α-alumina. In calcining, the α-alumina is subjected to a high temperature treatment (typically between 1,100 and 1,200° C.), such temperature being insufficient to fuse individual particles together (although some agglomeration may occur). Calcined alumina is to be distinguished from other forms of alumina, such as sintered, fused, or tabular alumina, which are heated to a higher temperature such as 1,650° C., at which fusing occurs.

The α-alumina contains at least 10, and preferably at least 20, weight % particles having a particle size of at least 74 μm, the weight % being based on the total weight of the alumina. Preferably, substantially all the particles in the α-alumina are below 700 μm in size, more preferably below 176 μm in size. In certain applications, compositions of this invention are employed as thin pads. Evidently, in such applications the particle size should be kept below the thickness of the pad. Particle size is measured by a light scattering technique, according to ASTM C1070-86 (Reapproved 1992). For particle sizes greater than 176 μm, mechanical or hand sieving according to ASTM C92-88 is recommended.

Also preferably, the α-alumina is a powder which has a bulk density of less than 1.0 g/cm$^3$, as measured according to ASTM D1895-69 (Reapproved 1979), Method A.

α-Alumina with the particle size distribution as taught herein may be obtained by selecting the appropriate grade of commercially available α-alumina or by combining different commercial grades. Suitable grades of α-alumina include Alcan C-75 (unground), Alcan C-751 (a purer grade of C-75), Alcan C-76 (unground), Alcoa A-12 (unground), individually or mixed with each other or mixed with some other α-alumina such as Alcan C-75 (−325 mesh) and Alcoa A-12 (−325 mesh).

Additives conventionally used in the art can be added, including antioxidants, UV stabilizers, flame retardants (both halogenated and non-halogenated), acid scavengers, and pigments.

To improve the blending of the α-alumina with the gel material, a coupling agent can be added. When blending high levels of inorganic fillers into organic or polymeric materials, coupling agents are sometimes added to aid mixing and to modify the interaction of the filler with the matrix. The filler can be treated with the coupling agent before its addition to the organic phase, or the coupling agent can be added to the organic phase, followed by the filler. Two common types of coupling agents are the organosilanes and the organic titanates.

Organosilanes contain hydrolyzable groups (typically halogen, alkoxy, acyloxy, or amine) which, following hydroysis, form a reactive silanol group which can condense with the α-alumina and additionally a nonhydrolyzable organic radical that possesses a functionality for imparting desired characteristics. Most of the widely used organosilanes have one such organic radical. Typical examples of useful silane coupling agents include trimethoxysilanes, triethoxysilanes, methyldiethoxysilanes, and methyldimethoxysilanes containing one of the following substituents: phenyl, vinyl, $C_1$–$C_{10}$ alkyl, 3-phenylpropyl, 2-phenylethyl, 3-methacryloxypropyl, 3-acryloxypropyl, allyl, aminophenyl, aminopropyl, benzyl, chloromethyl, chloromethylphenyl, vinylphenyl, 2-cyanoethyl, and the like.

Organic titanates typically are alkyl esters of titanium which hydrolyze rapidly and can also be used in surface modification of inorganic fillers. Typical examples of organic titanate coupling agents include the $C_1$–$C_{10}$ alkyl titanates, such as tetraisopropyl titanate, tetra-n-butyl titanate, and tetrakis(2-ethylhexyl) titanate, and titanate chelates, such as titanium acetyl acetonate and titanium ethyl acetonate.

We have found that it is preferred to subject the combination of the α-alumina and gel (or precursor(s) thereof, as the case may be), to mechanical mixing in which at least 10 Joule/g of specific energy is imparted thereto (hereinafter the "high specific energy regimen"). Specific energy is the mechanical energy per unit mass which is imparted to the combination by the mixer. The units for specific energy are energy per mass, e.g., Joule/g. The energy imparted can be directly measured on many mixing instruments by determining the amount of power used to mix the combination and multiplying by the time of mixing. In turn, the amount of power used can be determined by subtracting the power consumed in driving the mixing elements of the mixing instrument when the instrument is run without the combination present from the power consumed in driving the mixing elements when combination is present. Examples of mixing instruments which can be used to impart the above mixing energy include a Brabender Plasti-Corder® mixer, a Cowles mixer, a two roll mill, a Versamixer, a single- or twin-screw extruder, a Sigma-blade mixer, an impeller mixer such as a Meyer mixer, and the like.

We have observed that, with the high specific energy regimen, the combination tends to be much more fluid, even pourable, and the end product is a much softer, more conformable composition, while without it the combination is a thick paste or has the consistency of a wetted powder and the end product is not nearly as conformable.

Generally, mechanical mixing is required to input such an amount of energy. Hand mixing, with a spatula or mixing rod, imparts a relatively low amount of energy per unit time. Hand mixing for time scales of less than 10 minutes results in a mixing process which is relatively low in specific energy, that is lower than about 2 Joule/g.

The practical upper limit on specific energy will be determined more by economic and convenience considerations. One can keep mixing the compositions at the power levels described here for days or weeks with no damage to the materials, but it is impractical to do so. One can obtain these specific energies of mixing by mixing at a low power for long times or with higher power for shorter times. It is preferred to use a specific power of at least 0.001 W/g, preferably at least 0.003 W/g. Typical mixing times are from about 20 to about 60 min. If the specific power is too high, heating and degradation of the material can occur. If the specific power is too low, too much time is required. One skilled in the art will appreciate that, therefore, as a matter of practicality, one should avoid either extreme of specific power, and that the time, temperature, and mixing speed needed to obtain the desired specific energy will vary with the type of equipment and type of composition.

Where the gel is a thermoplastic gel, such as based on SEPS or SEBS, the α-alumina can be simply combined with the polymer and extending fluid and, if desired, subjected to the high specific energy regimen.

Where the gel is a thermoset (curing) gel, such as based on polydimethylsiloxane, several preparative options are available. In a thermoset system, the gel is made from first and second components which are mutually reactive when mixed, plus extender fluid. In one variation, the α-alumina is combined with the first and second components and optionally subjected to the high specific energy regimen. While typically the α-alumina is substantially evenly apportioned between the first and second components (on a weight/weight basis), uneven apportionment (up to and including adding all of the α-alumina to only one of the components) is permissible. In the instance where there is uneven apportionment and the high specific energy regimen is applied, it should be applied to the combination(s) wherein the weight ratio of α-alumina to the first or second component (as the case may be) is equal to or greater than 3:2. Then the combinations are mixed and allowed to cure to form a gel. In an alternative embodiment, the first and second components are combined, followed by the α-alumina, and then the optional high specific energy regimen is applied. In such an embodiment, the components and the catalyst (if any) should be selected such that the cure rate is slower than the amount of time needed to complete the high specific energy regimen.

The compositions of this invention and the gels used therein (or their precursors) can be characterized by various analytical techniques, described following. The hardness, stress relaxation, and tack are measured with a Voland-Stevens texture analyzer model LFRA, Texture Technologies Texture Analyzer TA-XT2, or like machines, using a five kg load cell to measure force, a 5 gram trigger, and ¼ inch (6.35 mm) stainless steel ball probe as described in Dubrow et al., U.S. Pat. No. 5,079,300 (1992), the disclosure of which is incorporated herein by reference. For example, a 20 mL glass vial containing about 12.5 g of analyte (gel or other material to be analyzed) is placed in the TA-XT2 analyzer and the probe is forced into the analyte at the speed of 0.2 mm/sec to a penetration depth of 4.0 mm. Alternatively to using analyte contained in vials, the analyte can be in the form of a stack of nine 2 inch×2 inch×⅛ inch thick slabs or a stack of four 1-1/16 inch diameter, ¼ inch thick slabs held between two half-shells of 1 inch diameter copper tubing. The hardness of the analyte is the force in grams required to force the probe to penetrate or deform the surface of the analyte for the specified 4.0 mm distance. Higher numbers signify harder materials. The data from the TA-XT2 Analyzer is recorded and analyzed on an IBM PC or like computer, running Microsystems Ltd, XT.RA Dimension Version 3.7G software.

The tack and stress relaxation are read from the stress curve generated when the XT.RA software automatically traces the force versus time curve experienced by the load cell when the penetration speed is 2.0 mm/sec and the probe is forced into the analyte at a pre-set penetration distance of about 4.0 mm. The probe is held at that penetration for 1 min and withdrawn at a speed of 2.0 mm/sec. The stress relaxation is the ratio of the initial force ($F_i$) resisting the probe at the pre-set penetration depth minus the force resisting the probe ($F_f$) after 1 min, divided by $F_i$ and expressed as a percentage. That it, the percent stress relaxation is given by:

$$\frac{(F_i - F_f)}{F_i} \times 100\%$$

Stress relaxation is a measure of the ability of the analyte to relax any induced compression placed thereon. Tack is the force in grams resisting the probe as it is pulled out of the analyte when the probe is withdrawn at a speed is 2.0 mm/second from the preset penetration depth.

Tensile strength, ultimate elongation, and toughness are determined on a Model 4501 Instron tester with as 22.5 $lb_f$ load cell. Microtensile test specimens (dogbones) are cut according to dimensions described in ASTM 1708-93, where the overall length is 1.5 inches and the thickness of these sheets of analyte is ⅛ inch. Two parallel fine lines 0.25 inch apart (benchmark) are drawn with a fine tip pen on the thin section of the test specimen, perpendicular to the direction of elongation. The Instron tester is used to apply a constant strain rate of 5 in/min. The distance between the two parallel lines is continuously monitored until failure. The ultimate elongation is calculated by subtracting the original benchmark separation from the benchmark separation at break, dividing by the original benchmark separation and expressing the result as a percentage. The software (Series IX, version 5.30) provided with the Instron tester monitors the stress created in the sample during the constant strain rate experiment. The software integrates the area under the stress-strain curve to determine the toughness of the sample. In all cases, at least seven dogbones are tested for each material.

An alternative way to characterize materials is by cone penetration (CP) values according to ASTM D-217-82 as taught in Debbaut, U.S. Pat. No. 4,600,261 (1986); Debbaut, U.S. Pat. No. 4,634,207 (1987); Debbaut, U.S. Pat. No. 5,140,746 (1992); and Debbaut, U.S. Pat. No. 5,357,057 (1994). CP values range from about 70 ($10^{-1}$ mm) to about 400 ($10^{-1}$ m). Harder gels are preferably from about 70 ($10^{-1}$ mm) to about 120 ($10^{-1}$ mm). Softer gels, preferably used to seal terminals, wire splices, and the like, are from about 200 ($10^{-1}$ mm) to 400 ($10^{-1}$ mm) with a particularly preferred range of from about 250 ($10^{-1}$ mm) to about 375 ($10^{-1}$ mm). For a particular materials system a relationship between CP values and hardness can be developed as taught in Dittmer et al., U.S. Pat. No. 4,852,646 (1989). All the patents cited in this paragraph are incorporated herein by reference.

Thermal conductivity is measured using a modification of ASTM E1530-93 Guarded Heat Flow Meter method on an Anter Model 2021 Thermal Conductivity instrument. The modification involves the inclusion of a spacer between the upper and lower plates to ensure that the dimension of a sample is accurately measured and stays constant throughout the test. The spacer is machined out of Teflon PTFE and is designed to have minimal influence on the conductivity measurement while maintaining a consistent gap between the upper and lower plates.

Samples are 2 inches in diameter and 100 to 120 mil thick. Thermal transfer compound (Anter 2021-075) is applied to the upper and lower plates before insertion of the sample. A pressure of 30 psi is applied to compress the sample. For soft materials, the samples compress until the upper plate rests on the 90 mil thick spacer. After 15 minutes under load at room temperature, a thickness measurement is taken. A calibrated test method is used to ensure that the heat flux transducer is calibrated to the temperature and sample resistance ranges. When the test is initiated, heat flows from the upper plate through the sample to the lower plate, creating an axial temperature gradient. The heat flux through the sample is measured with a heat flux transducer located just below the sample. By measuring the temperature difference across the sample along with the output from the heat flux transducer, thermal conductivity of the sample can be determined when the thickness is known. At thermal equilibrium, the Fourier heat flow equation applied to the sample is:

$$R_s = [(T_u - T_m)/Q] - R_{int}$$

where
$R_s$=thermal resistance of test sample
$T_u$=upper plate surface temperature
$T_m$=lower plate surface temperature
Q=heat flux through test sample
$R_{int}$=total interface resistance between sample and surface plates Thermal conductivity is obtained by dividing sample thickness by sample thermal resistance.

To improve handleability, the compositions of this invention may be internally supported or reinforced by a flexible matrix such as a polymer, fiberglass or metallic mesh or fabric, or an open cell foam. The gel permeates the interstitial space in the matrix and is rendered more handleable thereby. The matrix serves to improve the mechanical properties of the composition, such as tensile strength and modulus of elasticity. A fabric matrix may be a single layer or a plurality of layers and it may be woven or non-woven. Where electrical conductivity is undesirable (for example to avoid short circuiting electrical components), a metallic mesh or fabric should not be used. A preferred material for the flexible matrix is polyurethane. Gel impregnated matrices, applications therefor, and variants thereof are disclosed in Uken, U.S. Pat. No. 4,865,905 (1989), the disclosure of which is incorporated herein by reference. FIG. 1a shows a composition 1 of this invention supported by an open cell foam matrix 2. FIG. 1a shows the same composition 1 supported by a fabric matrix 3.

The highly thermally conductive and conformable compositions of our invention can be used to seal gaps and at the same time conduct heat away from circuit boards and electronic components to a metal plate, cabinet or casing, cooling device, or other heat sink or heat dissipating element. The composition is especially suitable for thermal control and/or encapsulation of irregularly shaped components such as transistors, printed circuit boards, integrated circuits, capacitors, resistors, diodes, power amplifiers, transformers, and other electrical or electronic components which generate heat during service. The composition is also suitable for thermal control in light valve modules in displays, for example liquid crystal projection displays in which a liquid crystal material is combined with an active matrix (e.g., CMOS) driver. In such displays, heat is generated not only from the electrical power drawn but also by the absorption of light from the projector lamp.

The practice of our invention can be further understood by reference to the following examples, which are provided by way of illustration and not of limitation.

EXAMPLE 1

A one part gel precursor was made by adding 7.8 g of VDT-131 (1000 cSt 1% methylvinylsiloxane polydimethylsiloxane, Gelest, Inc.), 23.4 g of PS445 (10,000 cSt vinyl terminated polydimethylsiloxane, United Chemical Technologies, Inc.), 93.6 g of 1000 cSt polydimethylsiloxane fluid (Shin-Etsu), 0.62 g of t-butyl peroxybenzoate (Aldrich Chemical), and 0.62 g of vinyltriethoxysilane coupling agent (Gelest, Inc.) to a 250 mL beaker and mixing with an overhead stirrer for 5 minutes at room temperature.

Into a one liter Pyrex dish was added 120.94 g of the gel precursor and 330.0 g of $\alpha$-alumina. The material was mixed by hand (a low specific energy process) using a 2 inch wide brass spatula for 5 to 6 minutes until the mixture had a homogeneous appearance. One third of the mixture was retained and the remainder was put onto a 3" diameter two roll mill with a 6:5 gear ratio. The gap between the two rollers was adjusted so that material would turn over on top. Material was constantly scraped from the bottom half of the rollers with a brass spatula and placed on the top half to enhance turnover. The material was mixed at room temperature and 36 rpm for 20 min. on the mill. Half of the material was removed and the remaining half was mixed for another 40 min. on the mill. The viscosity of the material dropped as the mixing proceeded. The hand mixed material had the consistency of a thick paste (or, in the case of 100% C-75 (unground), the consistency of a wetted powder), while the material after mixing on the two roll mill was a pourable fluid.

Thermal conductivity samples were prepared by compression molding 18.5 g of the $\alpha$-alumina/gel composite in aluminum rings to form 2.5" diameter, 0.1" thick disks. Samples were degassed in a vacuum chamber for 2 to 3 minutes then cured for 30 minutes in a 160° C. press under 10,000 psi ram pressure. Samples were transferred to a water cooled press and held for 5 min at 10,000 psi ram pressure in order to cool the samples to room temperature. Two inch diameter disks were cut from the center of the 2.5 inch disks using a leather punch. The samples were tested for thermal conductivity by the test described above.

Samples for hardness measurements were prepared by compression molding 84 g of the composition in aluminum picture frames, 3"×3" square by ¼" thick. Samples were degassed in a vacuum chamber for 2 to 3 minutes, then cured for 30 minutes in a 160° C. press under 10,000 psi ram pressure. Samples were transferred to a water cooled press and held for 5 min at 10,000 psi ram pressure in order to cool the samples to room temperature. Four 1-1/16" diameter disk were cut from the slab using a leather punch. The four disks were stacked and held together between two half shells of 1" diameter copper piping. The hardness of this stack was measured on the TA-XT2 analyzer as described above.

Compositions made from 4 different types of $\alpha$-alumina (all from Alcan Chemicals) were prepared using the above procedure: (a) C-75 Fine (−325 mesh, about 44 $\mu$m), (b) a blend of 30 wt. % C-75 Unground and 70 wt. % C-75 Fine, (c) a blend of 60 wt. % C-75 Unground and 40 wt. % C-75 Fine and (d) C-75 Unground. The results are summarized in Table 1 below:

TABLE 1

Thermal Conductivity (W/m-°C.) for $\alpha$-Alumina/gel Compositions

| Two Roll Mixing time, min. | 100% C-75 Fine | 30% unground/ 70% fine | 60% unground/ 40% fine | 100% C-75 unground |
|---|---|---|---|---|
| 0 | 1.63 | 2.43 | 3.29 | 2.96 |
| 20 | 1.48 | 2.07 | 2.61 | 2.42 |
| 60 | 1.44 | 1.91 | 2.19 | 2.00 |

TABLE 2

Texture Analyzer Hardness (g) for $\alpha$-Alumina/gel Compositions

| Two Roll Mixing time, min. | 100% C-75 fine | 30% unground/ 70% fine | 60% unground/ 40% fine | 100% C-75 unground |
|---|---|---|---|---|
| 0 | 1,349 | 4,905 | >5,000 | >5,000 |
| 20 | 903 | 1,035 | 1,740 | 2,424 |
| 60 | 432 | 564 | 626 | 684 |

The data show that by increasing the relative amount of unground (i.e., larger particle size) material at the same overall weight loading, the thermal conductivity of the composite materials is raised, even where no high mechanical energy is input. The data also show that the hardness of the composite is lowered by mixing the material at relatively high shear on the two roll mill, under a high specific energy regimen. It is desired for materials of the present invention to have low hardness and high thermal conductivity. The thermal conductivity is lowered as the samples are subjected to higher energy mixing, but the change in thermal conductivity is small, while at the same time, the hardness is lowered significantly. These samples also had an ultimate elongation of greater than 50%. The combination of thermal conductivity and hardness for the samples containing blends of unground and fine alumina is particularly desirable.

EXAMPLE 2

Into a 400 mL beaker was added 69.73 g of the part A from McGhan-Nusil 8170 silicone gel and 190.27 g of an $\alpha$-alumina blend (30 wt. % C-75 unground/70 wt. % C-75 fine alumina). The material was mixed by hand using a 1" wide stainless steel spatula for 5 to 6 minutes until the mixture had a homogeneous appearance. The same procedure was used to prepare the alumina filled part B. The hand-mixing procedure is a low specific energy mixing process.

A computerized Brabender Plasti-Corder®, Model DR-2052, was used to provide the mixing. The mixer evaluation selected was Semi-Automatic Universal Evaluation, version 4.0. The measurements included were instantaneous torque, temperature, blade speed, and the calculated results included the above measurements and the total mixing energy. Into a 60 cc Brabender mixing bowl equipped with roller blades was added 120 grams of alumina filled part A. The material was mixed at 40 rpm (gear ratio 3:2) for 1 hour at 25° C. The mixing torque was monitored in real time and showed a 69% decrease from 36.2 meter-gram to 11.3 meter-gram. The specific energy input to the part A was 19.2 Joule/g. The alumina filled part B was prepared in a similar manner and showed a 64% decrease from 34.1 meter-gram to 12.3 meter-gram. The specific energy input to part B was 19.2 Joule/g. Again, the hand mixed material had the consistency of a paste, while the material after mixing in the Brabender bowl was a pourable fluid.

Samples from the above process were prepared in the same manner described in Example 1 for the measurement of thermal conductivity and Texture Analyzer hardness. The thermal conductivity and texture analyzer hardness results are summarized below.

TABLE 3

Thermal Conductivity And Texture Analyzer Hardness For 30% Unground/70% Fine α-Alumina/Gel Compositions

| Mixing time, min. | Thermal conductivity, W/m °C. | Hardness, g |
|---|---|---|
| 0 | 2.65 | 864 |
| 60 | 2.26 | 480 |

These results also show that softer alumina/gel compositions were made without compromising thermal conductivity. These compositions also had ultimate elongations greater than 50%.

EXAMPLE 3

A one part EPDM gel precursor was made by combining 34.13 g EPDM solution with 105 g C-75 alumina, 0.52 g phenyltriethoxysilane, and 0.35 g t-butyl peroxybenzoate in a Brabender mixing bowl. The EPDM solution consisted of 12 wt. % Royaltuf 465 (EPDM, Uniroyal), 1 wt. % of Irganox 1076 antioxidant (Ciba-Geigy), 1 wt. % triallyl isocyanurate, and 86 wt. % mineral oil (Hydrobrite 380, Witco Corp.).

A computerized Brabender Plasti-Corder®, Model DR-2051, was used to provide the mixing, as described above. The alumina filled EPDM gel precursor was put into an 85 cc Brabender mixing bowl equipped with cam blades. The material was mixed at 30 rpm (gear ratio 3:2) for 1 hour at 35° C. For the sample containing C-75 unground alumina, the mixing torque decreased 70% from 555 meter-gram to 166 meter-gram. For the sample containing C-75 fine alumina, the mixing torque decreased 35% from 325 meter-gram to 212 meter-gram. The mixtures have a consistency of a paste.

Thermal conductivity samples were prepared by compression molding 22 g of the alumina/gel composite in aluminum rings, 2.5" ID by 0.1" thick. Samples were cured for 15 minutes in a 145° C. press under 20,000 psi ram pressure, then cooled for 5 minutes in a water cooled press under 20,000 psi ram pressure. Two inch diameter disks were cut from the center using a leather punch. The thermal conductivity was 1.17 W/m °C. for the C-75 unground sample and 0.87 W/m °C. for the C-75 fine sample. The thermal conductivities were obtained in a similar manner to those described above, but no spacer was used. The advantage of using larger particle size calcined aluminas to obtain higher thermal conductivity is demonstrated.

EXAMPLE 4

Into a 2.5 liter Sigma Blade mixer was added 60 g of Septon 2006 (Kuraray), 1050 g of alumina, 15 g of Irganox 1076 (Ciba), 7.5 g of Irganox B220 (Ciba), 7.5 g of Tinuvin 327, and 360 g of Fina A360B mineral oil. The components were mixed for one hour at 220° C. Samples were removed from the Sigma Blade mixer and pressed into plaques for testing.

Composite materials from 5 different types of alumina were prepared using the above procedure. The 5 alumina types (all from Alcan Chemicals) were (a) 100% C-75 Fine(−325 mesh), (b) a blend of 30 wt. % C-76 Unground and 70 wt. % C-75 Fine, (c) a blend of 50 wt. % C-76 Unground and 50 wt. % C-75 Fine, (d) a blend of 70 wt. % C-76 Unground and 30 wt. % C-75 Fine, and (e) 100% C-76 Unground. Table 4 summarizes the results. (The elongation measurements for this Example 4 were done in accordance with ASTM D412-92 using rings cut from a ⅛ in. thick gel sheet. The ring dimensions were 0.887 in. ID and 1.136 in. OD, corresponding to an inner circumference of 2.79 in. The rate of extension was 4 in./min.)

TABLE 4

Thermoplastic Gel

| Alumina | Thermal Conductivity (W/m-°C.) | Ultimate Elongation (%) |
|---|---|---|
| 100% C75 Fine | 0.80 | 1,191 |
| 30 wt. % C-76 Unground and 70 wt. % C-75 Fine | 1.18 | 867 |
| 50 wt. % C-76 Unground and 50 wt. % C-75 Fine | 1.36 | 736 |
| 70 wt. % C-76 Unground and 30 wt. % C-75 Fine | 1.46 | 564 |
| 100% C-76 Unground | 1.50 | 311 |

The data show that by increasing the relative amount of unground material at the same overall weight loading, the thermal conductivity of the composite materials is raised. The modulus and elongation data show that the materials are relatively soft and have high elongation despite the high loading of filler.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A method of making a thermally conductive and conformable composition, comprising the steps of:

(a) providing 100 parts by weight of a gel; and (b) combining the gel with between 150 and 400 parts by weight of α-alumina, wherein at least 10 per cent by weight of the α-alumina has a particle size of at least 74 μm, to form a combination of the gel material and the α-alumina; and (c) mixing the combination with a specific energy input of at least 10 Joule/g to make the thermally conductive and conformable composition.

2. A method according to claim 1, wherein the gel is a thermoplastic gel made from styrene-(ethylene butylene)-styrene or styrene-(ethylene propylene)-styrene block copolymer.

3. A method according to claim 1, wherein the α-alumina is calcined α-alumina.

4. A method according to claim 1, wherein the α-alumina is a powder which has a bulk density of less than 1.0 g/cm$^3$.

5. A method according to claim 1, wherein the thermally conductive and conformable composition has a thermal conductivity of at least 1.3 watt/m-°C., a hardness of less than 1,000 g, and an elongation at break of at least 50%.

6. A thermally conductive and conformable composition, made by the method of claim 1.

7. A method of making a thermally conductive and conformable composition, comprising the steps of:

(a) providing 100 parts by weight of a precursor material curable into a gel;

(b) combining the precursor material with between 150 and 400 parts by weight of α-alumina, wherein at least 10 per cent by weight of the α-alumina has a particle size of at least 74 μm, with a specific energy input of at least 10 Joule/g, to form a combination of the precursor material and the α-alumina; and (c) curing the precursor material into a gel to form the thermally conductive and conformable composition.

8. A method according to claim 7, wherein the gel is an organopolysiloxane gel.

9. A thermally conductive and conformable composition, made by the method of claim 7.

10. A method of making a thermally conductive and conformable composition, comprising the steps of:

(a) separately providing first and second precursor components, which when mixed together cure to form a gel, the combined amounts of the first and the second precursor components totaling 100 parts by weight;

(b) separately combining α-alumina with each of the first and second precursor components, with a specific energy input of at least 10 Joule/g, to form respective first and second combinations comprising α-alumina and a first or second precursor component respectively, wherein at least 10 weight per cent of the α-alumina has a particle size of at least 74 μm and the total amount of α-alumina is between 150 and 400 parts by weight; and (c) mixing the first and second combinations and curing to form the thermally conductive and conformable composition.

11. A method according to claim 10, wherein the weight ratio of α-alumina to the first or second component, respectively, is equal to or greater than 3:2.

12. A method according to claim 10, wherein the gel is an organopolysiloxane gel.

13. A thermally conductive and conformable composition, made by the method of claim 10.

14. A thermally conductive and conformable composition, made by the method of claim 11.

* * * * *